(12) United States Patent
Kumagai et al.

(10) Patent No.: US 7,522,268 B2
(45) Date of Patent: Apr. 21, 2009

(54) DISTANCE MEASURING DEVICE

(75) Inventors: Kaoru Kumagai, Itabashi-ku (JP);
Ken-ichiro Yoshino, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/505,096

(22) Filed: Aug. 16, 2006

(65) Prior Publication Data

US 2007/0076189 A1    Apr. 5, 2007

(30) Foreign Application Priority Data

Sep. 30, 2005    (JP) .............................. 2005-286159

(51) Int. Cl.
*G01C 3/08* (2006.01)
(52) U.S. Cl. .................... 356/5.01; 356/4.07; 356/5.07
(58) Field of Classification Search ............ 356/139.01, 356/4.07, 5.01, 5.07
See application file for complete search history.

(56) References Cited

U.S. PATENT DOCUMENTS

| | | | | |
|---|---|---|---|---|
| 3,900,261 A * | 8/1975 | Wingate | ..................... | 356/5.03 |
| 4,531,833 A * | 7/1985 | Ohtomo | ..................... | 356/5.1 |
| 4,699,508 A * | 10/1987 | Bolkow et al. | ............. | 356/5.07 |
| 5,082,364 A * | 1/1992 | Russell | ..................... | 356/5.15 |
| 6,088,085 A | 7/2000 | Wetteborn | ................. | 356/5.01 |
| 2001/0002860 A1 | 6/2001 | Ohishi et al. | ................ | 356/5.01 |
| 2001/0013929 A1 | 8/2001 | Torsten | ..................... | 356/5.01 |
| 2003/0016163 A1 * | 1/2003 | Isaji | ........................... | 342/70 |
| 2004/0002637 A1 * | 1/2004 | Huang et al. | ................. | 600/300 |
| 2004/0047586 A1 * | 3/2004 | Schick et al. | ................ | 385/147 |

FOREIGN PATENT DOCUMENTS

| | | |
|---|---|---|
| JP | 4-313013 | 11/1992 |
| JP | 2694647 | 9/1997 |
| WO | 03/089950 | 10/2003 |

* cited by examiner

*Primary Examiner*—Thomas H Tarcza
*Assistant Examiner*—Timothy A Brainard
(74) *Attorney, Agent, or Firm*—Nields, Lemack & Frame, LLC

(57) ABSTRACT

Distance measuring device comprising a first light emitting unit for projecting a pulsed laser beam, a second light emitting unit for emitting a correction pulsed laser beam, a distance measuring light optical path to guide the pulsed laser beam for distance measurement toward a first photodetection unit, an internal reference light optical path for splitting an internal reference pulsed light from the pulsed laser beam for distance measurement and for guiding to a second photodetection unit, a correction light optical path for splitting the correction pulsed laser beam and for guiding to the first photodetection unit and the second photodetection unit, light amount adjusting means for changing light intensity of the correction pulsed laser beam and the internal reference pulsed light, and control arithmetic unit for calculating a distance based on difference of photodetection time of the pulsed light from the first photodetection unit and the second photodetection unit.

13 Claims, 10 Drawing Sheets

CHANGES OF LIGHT AMOUNT BY LIGHT AMOUNT ADJUSTING MEANS

FIG. 10
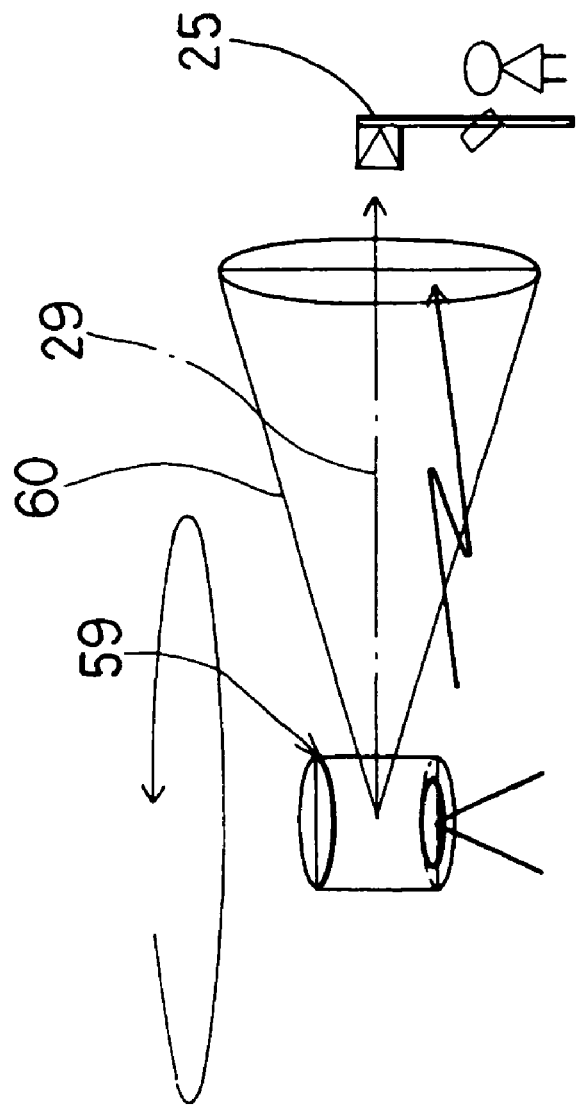
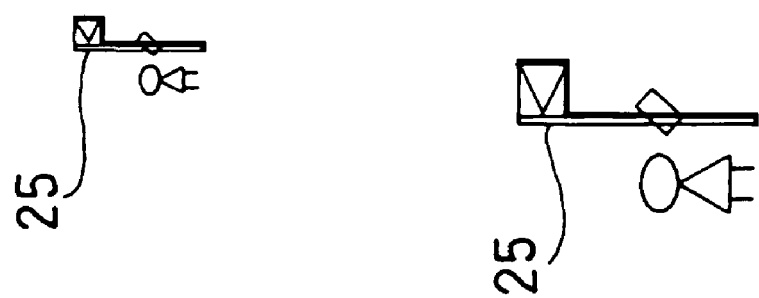

DISTANCE MEASURING DEVICE

BACKGROUND OF THE INVENTION

The present invention relates to a distance measuring device for projecting a laser beam to an object to be measured and for measuring a distance by receiving a reflection light from the object to be measured.

As a distance measuring device, a light wave distance measuring device is known, which measures a distance to an object to be measured by projecting a laser beam to the object to be measured and by using a reflected light from the object to be measured.

In the past, when the light wave distance measuring device is used, intensity of a laser beam is modulated at a fixed frequency. The laser beam is projected as a distance measuring light, and the reflected distance measuring light reflected by an object to be measured is received. A phase of intensity modulation of the reflected distance measuring light as received is compared with a phase of intensity modulation of an internal reference light obtained by an optical path for reference which is formed in the distance measuring device, and a distance to the object to be measured is measured from the phase difference.

In the distance measurement in the distance measuring device as described above, the change of the phase difference depending on the measured distance is utilized. The phase difference between the internal reference light and the reflected distance measuring light $\Delta\phi$ is expressed by the following equation 1:

$$\Delta\phi = 4\pi f D/C \qquad \text{(Equation 1)}$$

where D represents the measured distance, f represents modulation frequency, and C represents light velocity.

The measured distance D can be determined by measuring the phase difference $\Delta\phi$. Because an optical path length for reference is already known, correct distance can be obtained by correcting the measured distance thus obtained on the internal reference light optical path.

In the distance measurement, drift in detection circuit etc. inside the distance measuring device exerts influence as measurement error. By comparing the phase of the internal reference light and the reflected distance measuring light, the drift in the detection circuit etc. is offset, and correct distance can be calculated.

Referring to FIG. 12, description will be given below on general features of a conventional type distance measuring device.

A light emitting element 1 such as a laser diode emits a laser beam of which intensity is modulated to a predetermined frequency by a light emitting element driving circuit 12. By a half-mirror 2, the laser beam is split to a distance measuring light 3 and an internal reference light 4. The distance measuring light 3 transmits the half-mirror 2 and then the distance measuring light 3 is projected to an object 6 to be measured, e.g. a reflection mirror such as corner cube via an objective lens 5. A reflected distance measuring light 3' as reflected by the object 6 to be measured passes through the objective lens 5 and a half-mirror 8 and the reflection distance measuring light 3' is received by a photodetection element 7 such as an avalanche photo-diode.

The internal reference light 4 reflected by the half-mirror 2 is further reflected by the half-mirror 8 on an optical path of the reflected distance measuring light 3', and the internal reference light 4 is received by the photodetection element 7. A photodetection signal of the photodetection element 7 is inputted to a photodetection circuit 13. The photodetection circuit 13 performs processing on the signal inputted from the photodetection element 7 for calculating the distance.

An optical path switcher 9 is provided to stretch over the optical path of the distance measuring light 3 and the optical path of the internal reference light 4. On the optical path of the reflected distance measuring light 3', a light amount adjuster 11 is provided. The optical path switcher 9 selectively intercepts one of the optical path of the distance measuring light 3 and the optical path of the internal reference light 4 and transmits the other. The reflected distance measuring light 3' and the internal reference light 4 are alternately received by the photodetection element 7.

As described above, the distance measuring light 3 of which light intensity is modulated is used, and the distance is calculated by obtaining phase difference between the internal reference light 4 and the reflected distance measuring light 3' obtained from the distance measuring light 3. Due to difference of the receiving light amount (photodetection light amount) of the reflected distance measuring light 3' and the internal reference light 4, phase error is caused by amplitude of the photodetection element 7 or a circuit. The phase error gives influence on the accuracy of the distance measurement. Therefore, the light amount adjuster 11 is disposed for the purpose of eliminating the difference of the receiving light amount. The light amount adjuster 11 comprises a density filter with the density continuously changed. By rotating the density filter, the receiving light amount of the reflected distance measuring light 3' is adjusted to a constant level. By the light amount adjuster 11, it is so arranged that the receiving light amount of the internal reference light 4 received by the photodetection element 7 is to be equal to the receiving light amount of the reflected distance measuring light 3', even if reflecting light amount is changed according to the distance of the object to be measured 6.

Optical path switching by the optical path switcher 9 and light amount adjustment by the light amount adjuster 11 are controlled by a driving circuit 14.

A control arithmetic unit 15 controls the light emitting element driving circuit 12 in such manner that a laser beam emitted from the light emitting element 1 has light intensity modulation of a predetermined frequency, and the control arithmetic unit 15 controls the timing of optical path switching of the optical path switcher 9 by the driving circuit 14. Further, the control arithmetic unit 15 sends out a control signal to the driving circuit 14, and the control signal equalizes the light amount of the reflected distance measuring light 3' to the light amount of the internal reference light 4 based on the photodetection signal of the photodetection element 7.

The photodetection circuit 13 performs signal processing such as amplifying, A/D conversion, etc. on the signal from the photodetection element 7, at the same time, further performs the processing such as the determination etc. of phase difference between the modulated frequency of the internal reference light 4 and the modulated frequency of the reflected distance measuring light 3'. The photodetection circuit 13 sends out the signal from the photodetection element 7. Based on the phase difference sent from the photodetection circuit 13, the control arithmetic unit 15 calculates a distance to the object 6 to be measured from the above equation 1.

In the conventional type distance measuring device as described above, the switching between the internal reference light 4 and the reflected distance measuring light 3' is mechanically switched over by the optical path switcher 9.

Because both the optical path switching and the light amount adjustment are carried out mechanically, it is difficult to perform optical switching at high speed or the light amount adjustment at high speed, and it is difficult to measure the distance at high speed. For this reason, there is no problem when distance is measured on an object to be measured such as a building. However, when distance is measured continuously on a plurality of moving objects such as a construction machine, e.g. a bulldozer etc., by a single measuring device, that is when it is necessary to measure the distance at high speed, the distance measurement is often difficult to carry out. Also, in case 3-dimmensional measurement is to be carried out on a building etc. by using a total station etc., surveying must be made on multiple points by automatic surveying, and the measurement must be performed at high speed. In case surveying is performed on a moving object, There were problems such that the speed of the optical path switching and the speed of the light amount adjustment often cannot follow the moving speed of the moving object, and that the distance measurement cannot be carried out.

As a distance measuring device to determine the distance at multiple points and multiple directions by rotating a distance measurement light, the devices described in the Japanese Patent Publication No. 2694647 or in the Japanese Patent Publication Laid-Open 4-313013 are known.

SUMMARY OF THE INVENTION

It is an object of the present invention to provide a distance measuring device, by which it is possible to eliminate the procedure of optical switching in the distance measuring device, to perform the light amount adjustment at high speed, and to perform measuring the distance at high speed.

To attain the above object, the present invention provides a distance measuring device for measuring a distance by projecting a pulsed laser beam to an object to be measured and by receiving a reflected light from the object to be measured, comprising a first light emitting unit for projecting a pulsed laser beam for distance measurement, a second light emitting unit for emitting a correction pulsed laser beam, a distance measuring light optical path to guide the pulsed laser beam for distance measurement toward a first photodetection unit, an internal reference light optical path for splitting an internal reference pulsed light from the pulsed laser beam for distance measurement and for guiding to a second photodetection unit, a correction light optical path for splitting the correction pulsed laser beam and for guiding to the first photodetection unit and the second photodetection unit, light amount adjusting means for changing light intensity of the correction pulsed laser beam and the internal reference pulsed light, and a control arithmetic unit for calculating a distance based on difference of photodetection time of the pulsed light from the first photodetection unit and the second photodetection unit. Also, the present invention provides the distance measuring device as described above, wherein the light amount adjusting means is stretched over the internal reference light optical path and the correction light optical path. Further, the present invention provides the distance measuring device as described above, wherein the light amount adjusting means is provided independently on each of the internal reference light optical path and the correction light optical path. Also, the present invention provides the distance measuring device as described above, wherein light intensity of the internal reference pulsed light is varied by the light amount adjusting means provided on the internal reference light optical path, and light intensity of the correction pulsed laser beam is varied by varying the output of the second light emitting unit. Further, the present invention provides the distance measuring device as described above, wherein the light amount adjusting means comprises a density variable filter to change density in moving direction and the light amount adjusting means is so arranged that light intensities of the correction pulsed laser beam and the internal reference pulsed light are adjusted by moving the density variable filter. Also, the present invention provides the distance measuring device as described above, wherein the light amount adjusting means comprises a plurality of light sources for emitting the correction pulsed laser means and also comprises optical members for adjusting light amount of the light sources to each light source, wherein light intensity of the correction pulsed laser beam is adjusted by selectively turning on the plurality of light sources. Further, the present invention provides the distance measuring device as described above, wherein the light amount adjusting means comprises a light source for emitting the correction pulsed laser beam and a control arithmetic unit for adjusting light emitting intensity of the light source. Also, the present invention provides the distance measuring device as described above, wherein the light amount adjusting means comprises a plurality of light sources for emitting the correction pulsed laser beams and optical members for adjusting light amount of the light sources to each light source, and the control arithmetic unit for turning on selectively the plurality of light sources and for adjusting light emitting intensity of the light sources. Further, the present invention provides the distance measuring device as described above, wherein the correction pulsed laser beam is emitted alternately with the distance measuring pulsed light, and adjustment of the light intensity of the correction pulsed laser beam is performed for each light emission. Also, the present invention provides the distance measuring device as described above, wherein the correction pulsed laser beam is emitted by varying the light amount as many times as required within a light emission cycle of the distance measuring pulsed light. Further, the present invention provides the distance measuring device as described above, wherein the control arithmetic unit comprises a storage unit, wherein the storage unit stores photodetection difference of the photodetection unit based on a photodetection signal of the first photodetection unit and the second photodetection unit to match each correction pulsed laser beam with light intensity adjusted and based on a photodetection signal of the internal reference pulsed light, and wherein the control arithmetic unit selects a photodetection signal by the correction pulsed laser beam equal to or approximately equal to the photodetection signal at the receiving of the reflected distance measuring light from the stored photodetection signals, selects a photodetection signal by internal reference pulsed light equal to or approximately equal to a photodetection signal from the stored photodetection signals when the reflected distance measuring light is received and calculates the measurement distance from the reflected distance measuring light and the internal reference pulsed light based on a relation between the photodetection signal of the selected internal reference light and a photodetection signal of the reflected distance measuring light.

The present invention provides a distance measuring device for measuring a distance by projecting a pulsed laser beam to an object to be measured and by receiving a reflected light from the object to be measured, comprising a first light emitting unit for projecting a pulsed laser beam for distance measurement, a second light emitting unit for emitting a correction pulsed laser beam, a distance measuring light optical path to guide the pulsed laser beam for distance measurement toward a first photodetection unit, an internal reference light optical path for splitting an internal reference pulsed light from the pulsed laser beam for distance measurement and for guiding to a second photodetection unit, a correction light optical path for splitting the correction pulsed laser beam and for guiding to the first photodetection unit and the second photodetection unit, light amount adjusting means for changing light intensity of the correction pulsed laser beam and the internal reference pulsed light, and a control arithmetic unit for calculating a distance based on difference of photodetection time of the pulsed light from the first photodetection unit and the second photodetection unit. As a result, mechanical switching operation between the internal reference light optical path and the distance measuring light optical path is eliminated in the distance measurement, and the distance can be measured at high speed.

BRIEF DESCRIPTION OF THE DRAWINGS

FIG. 10 is a drawing to explain a distance measuring device, to which the present invention is applied;

DETAILED DESCRIPTION OF THE PREFERRED EMBODIMENTS

Figure 1:
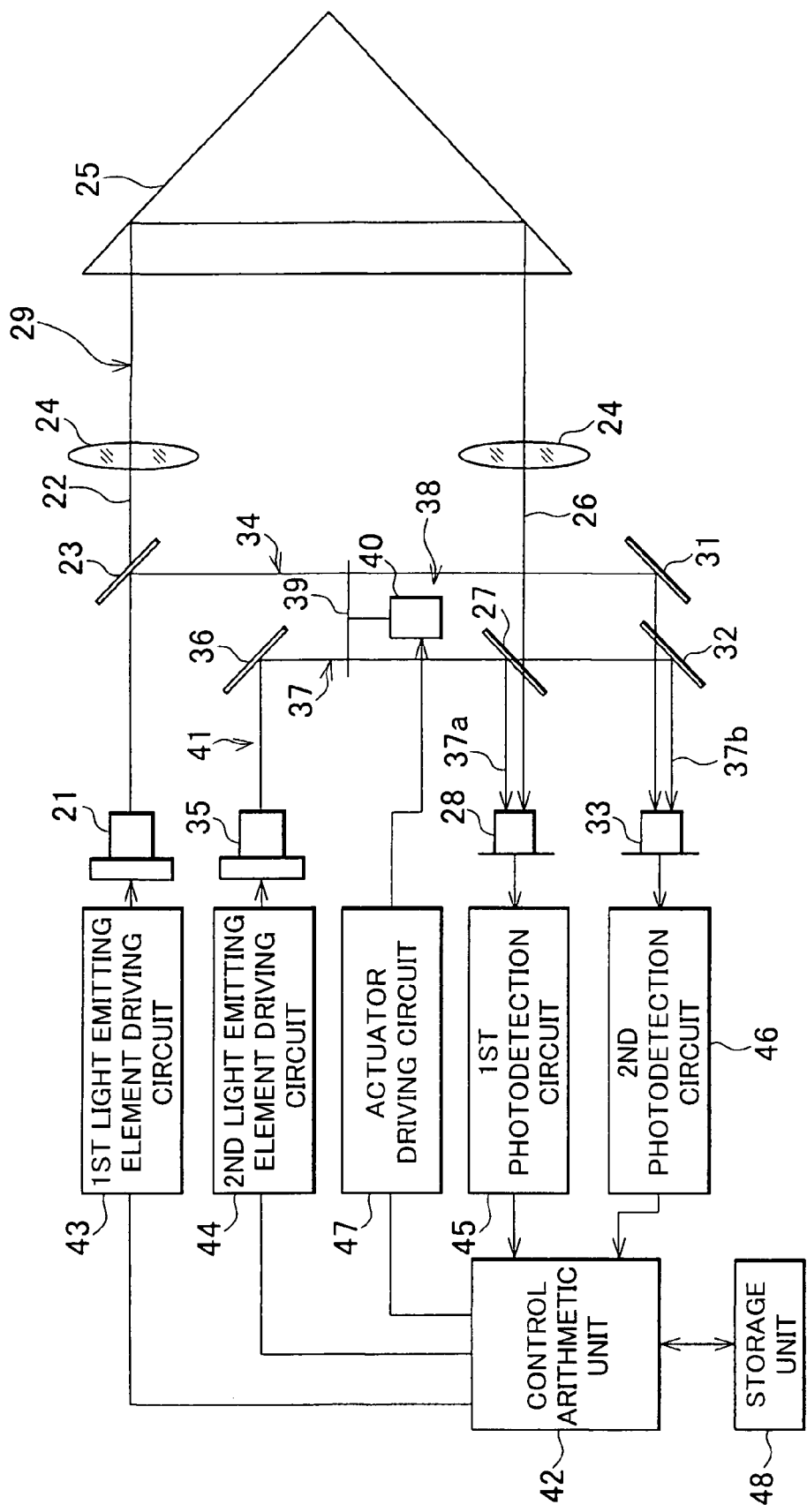
FIG. 1 is a schematical block diagram to show a first embodiment of the present invention.

Description will be given below on the best mode for carrying out the present invention referring to the drawings.

FIG. 1 represents a distance measuring unit in a first embodiment of the invention.

A first light source 21 is a light emitting element such as a laser diode, a pulsed laser diode, etc. for emitting a pulsed laser beam (distance measuring pulsed light) as a distance measuring light at an arbitrary timing. On a first optical path 22 of the first light source 21, there are provided a first half-mirror 23 and an objective lens 24. A pulsed laser beam emitted from the first light source 21 is projected to an object 25 to be measured as a measuring light via the first half-mirror 23 and the objective lens 24.

The object 25 to be measured may be any type of object, which reflects the projected measuring light at a necessary light amount for measurement. The object 25 to be measured may be a reflection prism, a retroreflective plate, or a surface of a natural object, etc. A reflected measuring light reflected by the object 25 to be measured enters the objective lens 24 via a second optical path 26. After passing through a second half-mirror 27, the reflected measuring light is received by a first photodetection element 28 such as a photo-diode. The first optical path 22 and the second optical path 26 make up together a distance measuring light optical path 29.

A part of the measuring light (internal reference pulsed light) split by the first half-mirror 23 is received by a second photodetection element 33 such as a photo-diode via a first mirror 31 and a third half-mirror 32. An optical path passing through the first half-mirror 23 and directing toward the second photodetection element 33 at the first mirror 31 constitutes an internal reference light optical path 34.

A second light source 35 is a light emitting element such as laser diode, pulsed laser diode, etc., which emits a pulsed laser beam (correction pulsed light) as a correction light at an arbitrary timing. A correction light emitted from the second light source 35 is reflected by a second mirror 36 via a correction light optical path 37 toward the second half-mirror 27 and the third half-mirror 32. The second half-mirror 27 divides the second correction light optical path 37 to a first correction light optical path 37a and a second correction light optical path 37b. A part of the correction light is split and is reflected toward the first photodetection element 28 via the first correction light optical path 37a. The third half-mirror 32 reflects a remaining part of the correction light after transmitting the half-mirror 27 toward the second photodetection element 33 via the second correction light optical path 37b. The second mirror 36, the second half-mirror 27, the third half-mirror 32, etc. make up together the correction light optical path 37. The second light source 35, the correction light optical path 37, etc. make up together a correction light optical system 41.

Here, the first half-mirror 23, the second half-mirror 27 and the third half-mirror 32 are light amount splitting means. As the light amount splitting means, additional optical member required such as a beam splitter may be used.

Light amount adjusting means 38 is provided at adequate positions on the internal reference light optical path 34 and the correcting light optical path 37, e.g. between the first half-mirror 23 and the first mirror 31 on the internal reference light optical path 34, or between the second mirror 36 and the third half-mirror 32 on the correction light optical path 37 so that the light amount adjusting means 38 stretches over between the internal reference light optical path 34 and the correction light optical path 37.

Figure 3:
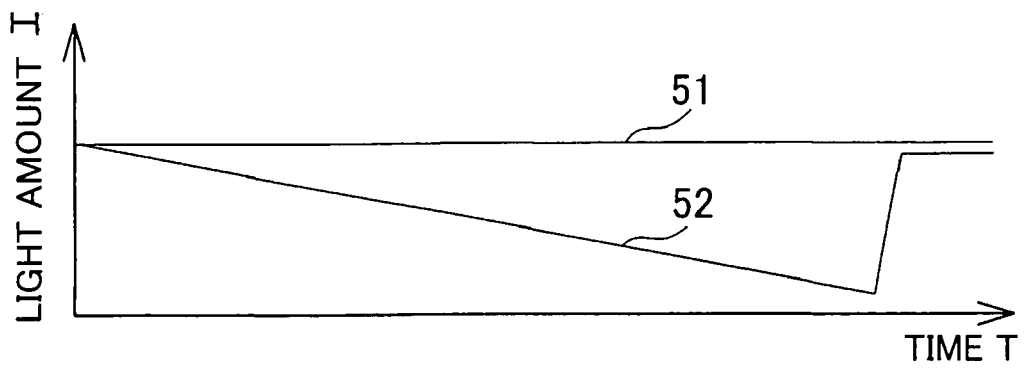
FIG. 3 is a diagram to show changes of light amount by light amount adjusting means in the first embodiment of the invention.

The light amount adjusting means 38 comprises a density variable filter 39 and an actuator 40 such as a motor to rotate the density variable filter 39. The density variable filter 39 has continuous density gradient in circumferential direction and the density variable filter 39 is arranged to intercept the internal reference light optical path 34 and the correction light optical path 37. When the density variable filter 39 is rotated by the actuator 40, the density at a position to intercept the internal reference light optical path 34 and the correction light optical path 37 is changed as shown in FIG. 3 (to be described later). For example, it is designed in such manner that a range where the density is 0 is present for a certain predetermined angle, and then the density is increased with the change of the angle. The change of density may be a linear change or a change in quadratic curve etc. Or, the change of density may be exponential change or may be stepwise change. In short, density change may be any change so far as it has a matching relation with angular change and density change.

The light amount adjusting means 38 has functions as the internal reference light optical path light amount adjusting means and as the correction light optical path light amount adjusting means. The internal reference light optical path light amount adjusting means may be provided on the internal reference light optical path 34 or the correction light optical path light amounting adjusting means may be arranged on the correction light optical path 37 independently from each other. In case the internal reference light optical path light amount adjusting means and the correction light optical path light amount adjusting means are provided independently from each other, the internal reference light optical path light amount adjusting means and the correction light optical path light amount adjusting means are driven in synchronization. These may be driven in non-synchronizing if light emitting conditions and photodetecting conditions of the first photodetection element 28 and the second photodetection element 33 are stored in a storage unit 48.

A control arithmetic unit 42 controls light emitting condition of the first light source 21 via a first light emitting element driving circuit 43 and also controls light emitting condition of the second light source 35 via a second light emitting element driving circuit 44. The control arithmetic unit 42 issues a control signal to an actuator driving circuit 47. Also, the control arithmetic unit 42 drives the actuator 40 via the actuator driving circuit 47 and rotates the density variable filter 39.

The density variable filter 39 may be designed in a tablet-like plate so that density is increased linearly and may reciprocally driven by means such as a linear motor.

A photodetection signal issued from the first photodetection element 28 is amplified on a first photodetection circuit 45. Further, the photodetection signal is received and detected by a comparator, and signal processing as required such as A/D conversion is performed, and the signal is inputted to the control arithmetic unit 42. A photodetection signal issued from the second photodetection element 33 is amplified on a second photodetection circuit 46 and is received and detected by comparator, and signal processing as required such as A/D conversion is performed, and the signal is inputted to the control arithmetic unit 42. By the control arithmetic unit 42, photodetection signal amount and delay time from the first photodetection circuit 45 and the second photodetection circuit 46 are stored in the storage unit 48.

The storage unit 48 comprises a data storing unit where the photodetection signal amount and the delay time of the first photodetection element 28 and the second photodetection element 33 are stored. Also, the storage comprises a program storing unit. Various types of programs are stored in the program storing unit. These programs are programs necessary for measurement such as: a sequence program for executing the measurement, a calculating program for calculating distance based on the photodetection signal of the first photodetection element 28 and the second photodetection element 33.

Description will be given below on operation.

First, general features of the operation will be described. A measuring light, i.e. a pulsed laser beam emitted from the first light source 21, is projected to the object 25 to be measured via the first optical path 22. A reflected measuring light reflected by the object 25 to be measured is received by the first photodetection element 28 via the second optical path 26. A part of the measuring light emitted from the first light source 21 is split by the first half-mirror 23. The light is then received by the second photodetection element 33 via the internal reference light optical path 34 as an internal reference pulsed light. Then, the distance measuring light is compared with the internal reference pulsed light, and values such as the difference of photodetecting time are determined. Based on the values such as the difference of photodetection time, a distance to the object 25 to be measured is determined.

There is individual difference in the first photodetection element 28 and the second photodetection element 33. An error based on individual difference generated between the first photodetection element 28 and the second photodetection element 33 is corrected by measurement difference obtained by using the correction light optical path 37.

The correction light, which is a pulsed laser beam emitted from the second light source 35, is deflected by the second mirror 36. Then, the correction light is split by the second half-mirror 27 and is sent to the first correction light optical path 37*a* and the second correction light optical path 37*b*, and these split correction lights are received by the first photodetection element 28 and the second photodetection element 33 respectively. Both photodetection signals from the first photodetection element 28 and the second photodetection element 33 are compared with each other, and the deviation of time is obtained. As a result, an error caused between the first photodetection element 28 and the second photodetection element 33 is measured.

Optical path length of the internal reference light optical path 34 is different from optical path length of the correction light optical path 37. However, each of these optical path lengths is already known from mechanical construction of the distance measuring device, and the error between the first photodetection element 28 and the second photodetection element 33 can be corrected.

The pulsed laser beam of the first light source 21 and the pulsed laser beam of the second light source 35 are emitted alternately. The timing of the light emitting of the first light source 21 and the second light source 35 is as follows: The first photodetection element 28 and the second photodetection element 33 receive the distance measuring light emitted from the first light source 21. After receiving the distance measuring light, the first light source 21 emits the light. And then the second light source 35 emits from recieving the light by photodetection elements to emitting the light by the first light source 21. Further, the first photodetection element 28 and the second photodetection element 33 are possible to receive the correction light.

The reflected measuring light is received by the first photodetection element 28, and the internal reference pulsed light is received by the second photodetection element 33 after splitting. As a result, there is no need to provide optical path switching means between the distance measuring light optical path 29 and the internal reference light optical path 34.

Light intensity of the reflected distance measuring light is changed depending on the measured distance to the object 25 to be measured or reflecting condition of the object 25 to be measured. Because there is individual difference between the first photodetection element 28 and the second photodetection element 33 and because the responsiveness to light intensity is also changed, the light intensity of the light received by the second photodetection element 33 via the internal reference light optical path 34 must be made equal or equivalent to the light intensity of the reflected distance measuring light. Also, light intensity of the correction light must be equal or equivalent to light intensity of the reflected measuring light. Therefore, the light amount adjusting means 38 is arranged for the internal reference light optical path 34 and for the correction light optical path 37 as described above.

Figure 2:
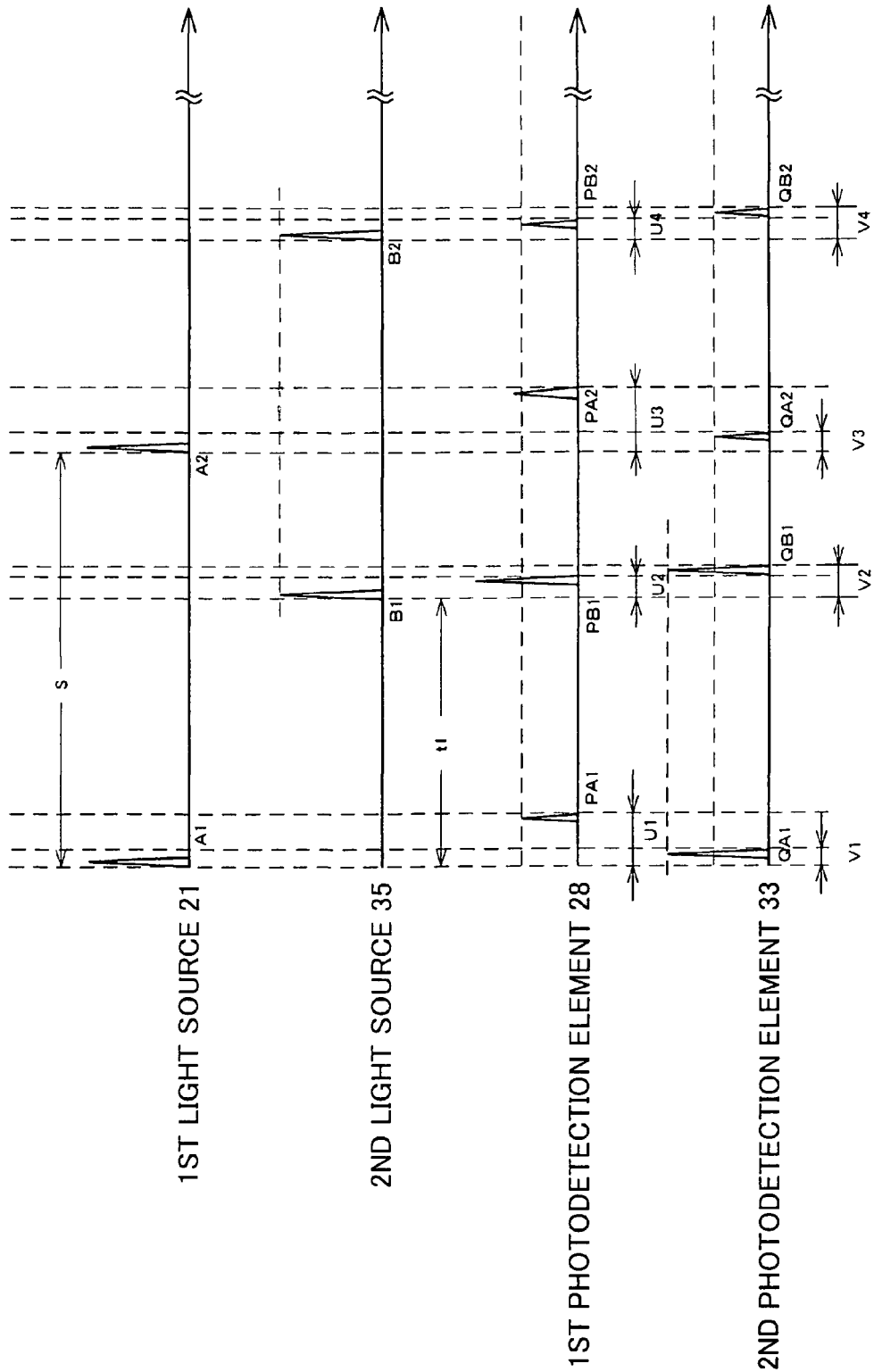
FIG. 2 is a diagram to show light emitting conditions of a first light source and a second light source and photodetecting (light receiving) conditions of a first photodetection element and a second photodetection element in the first embodiment of the invention.

Now, more concrete description will be given by referring to FIG. 2 and FIG. 3.

The first light source 21 and the second light source 35 emit pulsed laser beams with the same light emission cycle S. Light emission timing of the first light source 21 is deviated by "t1" from light emission timing of the second light source 35. Also, during the measurement, the actuator 40 is driven, and the density variable filter 39 is continuously rotated. By the rotation of the density variable filter 39, the internal reference pulsed light on the internal reference light optical path 34 is changed in synchronization with the light amount of the correction pulsed light on the correction light optical path 37.

FIG. 3 shows the change of the light amount due to the light amount adjustment by the light amount adjusting means 38. In the figure, reference numeral 51 denotes the emitted light amount from the second light source 35, and numeral 52 denotes transmission light amount of the light transmitting the density variable filter 39. The emitted light amount 51 is shown as a continuous light. Because the pulsed laser beam is emitted from the second light source 35, the density variable filter 39 is rotated in proportion to the light emission cycle S for each light emission from the second light source 35. The transmission light amount 52 is reduced stepwise from the maximum transmission light amount and is restored to the maximum transmission light amount after one turn. In this case, the maximum transmission light amount is set to a higher value than the value of the case where light intensity of the reflected distance measuring light is at the highest. Also, the minimum transmission light amount is set to a lower value than the value when light intensity of the reflected distance measuring light is at the lowest.

The light amount adjusting means 38 also adjusts light amount for the internal reference light optical path 34. The light amount adjusting means 38 gives a function similar to that of the correction light optical path 37 to the internal reference light optical path 34.

When a distance measuring pulsed light A1 is emitted from the first light source 21, the pulsed light is received by the first photodetection element 28 and the second photodetection element 33 respectively, and a photodetection pulse PA1 and a photodetection pulse QA1 are emitted respectively. A time U1 from the light emission of the distance measuring pulsed light A1 to the emission of the photodetection pulse PA1 is a time for distance measured, during which the distance measuring pulsed light A1 reciprocates to and from the object 25 to be measured. A time V1 from the light emission of the distance measuring pulsed light A1 to the emission of the photodetection pulse QA1 is a time, during which the distance measuring pulsed light A1 passes along the internal reference light optical path 34.

After the time t1 from the light emission of the distance measuring pulsed light A1, the light is emitted from the second light source 35. When a correction pulsed light B1 is emitted, the first photodetection element 28 and the second photodetection element 33 receive the correction pulsed light B1, and a photodetection pulse PB1 and a photodetection pulse QB1 are emitted respectively. A time U2 from the light emission of the correction pulsed light B1 to the emission of the photodetection pulse PB1 by the first photodetection element 28 and a time V2 from the light emission of the correction pulsed light B1 to the emission of the photodetection pulse QB1 by the second photodetection element 33 are respectively the time required when these lights pass along the correction light optical path 37. A value of (the time U2—the time V2) means individual difference between the first photodetection element 28 and the second photodetection element 33 (including circuit error) and optical path difference on the first correction light optical path 37a and the second correction light optical path 37b.

The density variable filter 39 is continuously rotated on the internal reference light optical path 34 and the correction light optical path 37. Thus, light intensities of the correction pulsed light and the internal reference pulsed light are continuously changed. When the density variable filter 39 is rotated by one turn, light intensity is changed in density variable range from maximum operation light amount to minimum operation light amount of the first photodetection element 28 and the second photodetection element 33.

For the first photodetection element 28 and the first photodetection circuit 45 and for the second photodetection element 33 and the second photodetection circuit 46, signal amount and difference of the photodetection time when the correction pulsed light and the internal reference pulsed light are received during one rotation of the density variable filter 39 are stored in the storage unit 48.

To calculate a distance measuring value based on photodetection pulse PA1, differences of the photodetection time (in FIG. 2, the time U4, the time V3, and the time V4) are used. And the differences of photodetection time are obtained from the photodetection pulse PBn, the photodetection pulse QAn, and the photodetection pulse QBn. The signal amount of PBn, the signal amount of QAn, and the signal amount of QBn are respectively equal to or approximately equal to the signal amount of the photodetection pulse PA1. As a result, the error caused by the difference of signal amount can be avoided. Distance value is acquired from the time U1 and the time V3. Correction value between the two types of photodetection circuits, i.e. the first photodetection element 28 and the first photodetection circuit 45, and the second photodetection element 33 and the second photodetection circuit 46, is acquired from the time U4 and the time V4. When the measured value is corrected by the correction value, a true distance value can be obtained.

For the correction of the measured value, see (Equation 2) to (Equation 8) as given later.

As described above, the density variable filter 39 is continuously rotated, and transmission light amount of the correction light is reduced stepwise. Photodetection pulses of the first photodetection element 28 and the second photodetection element 33 during one turn of the density variable filter 39 are sampled and are stored in the storage unit 48. During one rotation of the density variable filter 39, photodetection pulses of the first photodetection element 28 and the second photodetection element 33 with respect to the light intensity from the maximum transmission light amount to the minimum transmission light amount can be sampled. For the correction light to obtain the time U2 and the time V2, the photodetection pulse sampled at the control arithmetic unit 42 is compared with the photodetection pulse PA of the reflected distance measuring light, and a correction light pulse PB2 equal to the photodetection pulse PA or closest to the photodetection pulse PA (size of pulse signal) (see FIG. 2) is selected and used.

The sampling of the correction light may be carried out once at the starting of the measurement. Or, the sampling may be performed continuously during the measurement, and the sampling data may be constantly updated to the newest data.

According to the present invention, it is possible to perform distance measurement for each pulse of the distance measuring light 1. As a result, the time required for distance measurement can be extensively shortened. Thus, it is possible to perform measurement at multiple points while scanning the distance measuring light (scanning measurement), and it is also possible to measure the distance on a mobile object moving at high speed.

Figure 4:
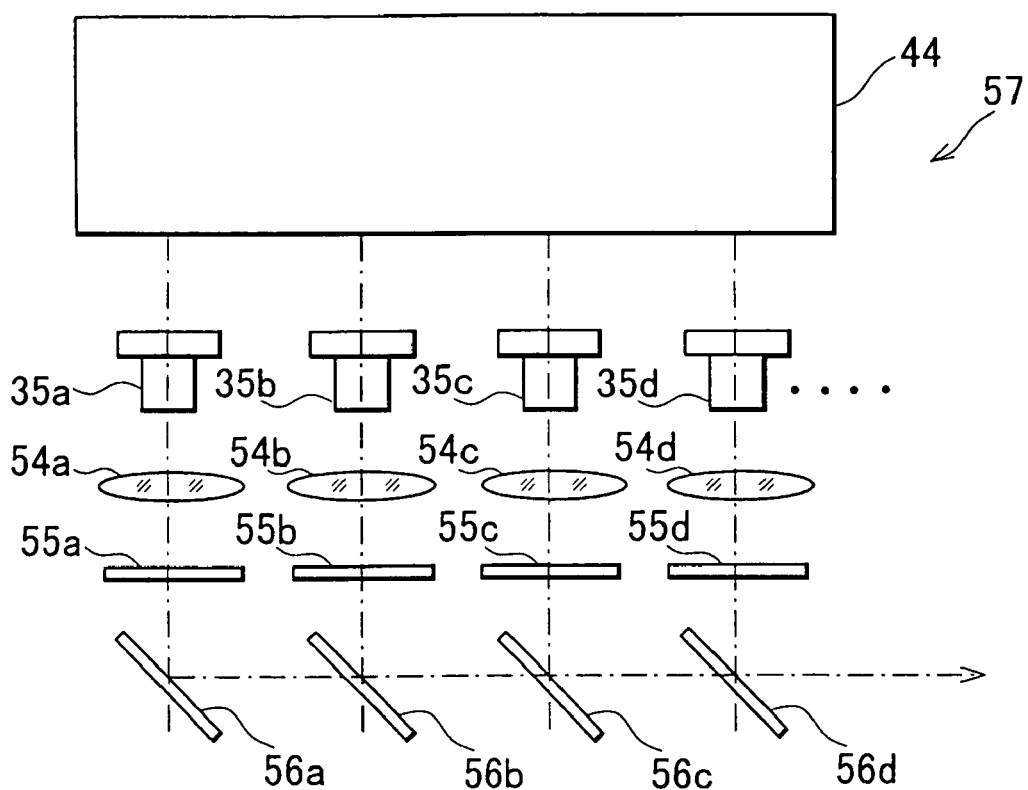
FIG. 4 is a schematical drawing to show essential portions in a second embodiment of the invention.
Figure 7:
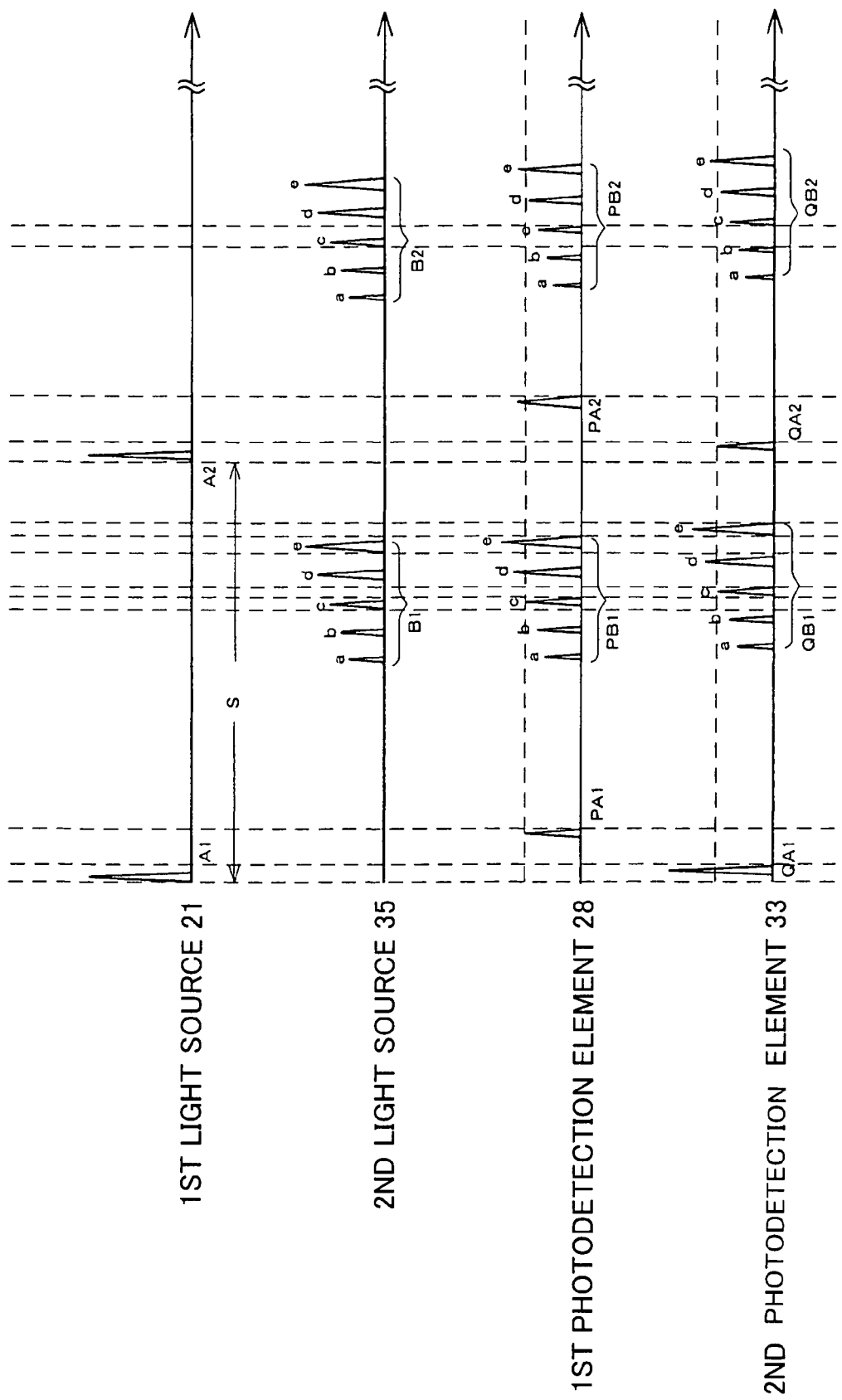
FIG. 7 is a diagram to show light emitting conditions of a first light source and a second light source and photodetecting (light receiving) conditions of a first photodetection element and a second photodetection element in the second embodiment of the invention.

FIG. 4 and FIG. 7 each represents an essential portion of a second embodiment of the present invention.

FIG. 4 shows another type of the light amount adjusting means for the correction light.

The light amount adjusting means in the second embodiment is provided in a light source unit 57.

The light source unit 57 comprises plurality of second light sources 35a, 35b, 35c, 35d, . . . , and each of these light sources emits a correction pulsed light via collimator lenses 54a, 54b, 54c, 54d . . . , and ND filters 55a, 55b, 55c, 55d, . . . Light emission from the second light sources 35a, 35b, 35c, 35d, . . . is controlled by a second light emitting element driving circuit 44. When a light emission command signal is inputted from the control arithmetic unit 42 (see FIG. 1), the second light emitting element driving circuit 44 emits pulsed lights from the second light source 35a to the second light sources 35b, 35c, 35d, . . . one after another at a predetermined time interval.

A mirror 56a is provided for the second light source 35a, and half-mirrors 56b, 56c 56d, . . . are provided for the second light sources 35b, 35c, 35d, . . . respectively, and the correction pulsed lights emitted from the second light sources 35a, 35b, 35c, 35d, . . . respectively are reflected on the correction light optical path 37 (see FIG. 1).

The number of the second light sources 35a, 35b, 35c, 35d, . . . is adequately determined to match the change of light intensity of the reflected distance measuring light as anticipated for the measurement.

Transmissivity and reflectivity of each of the ND filters 55a, 55b, 55c, 55d, . . . and the half-mirrors 56b, 56c, 56d, . . . are set in such manner that light intensity of the correction pulsed light is changed stepwise with a predetermined light amount difference when the correction light from the second light sources 35a, 35b, 35c, 35d, . . . transmits or is reflected by the half-mirror 56d and is projected along the correction light optical path 37. Also, if transmissivity and reflectivity of the half-mirrors 56b, 56c, 56d, . . . is set up, the ND filters 55a, 55b, 55c, 55d, . . . may be omitted.

Referring to FIG. 7, description will be given now on operation of the second embodiment.

When distance measuring pulsed lights A1, A2, . . . are emitted from the first light source 21, the pulsed lights are received by the first photodetection element 28 and the second photodetection element 33 respectively, and a photodetection pulse PA1 and a photodetection pulse QA1 are emitted respectively.

When correction pulsed lights (B1 [a, b, c, d, e]) with different light amounts of the second light sources 35a, 35b, 35c, 35d, . . . are emitted one after another during the light emission cycle S of said distance measuring pulsed light A1, A2, . . . one after another, the light emission timing of the second light sources 35a, 35b, 35c, 35d, . . . has sufficient time interval as the second photodetection element 28 emits the photodetection pulse PA. It is so designed that the time when the second light sources 35a, 35b, 35c, 35d, . . . finish to emit light is not overlapped on the time of light emission of the next distance measuring pulsed light A2.

When the correction pulsed lights (B1 [a, b, c, d, e]) are emitted, the correction pulsed lights (B1 [a, b, c, d, e]) are received by the first photodetection element 28 and the second photodetection element 33, and photodetection pulses (PB1 [a, b, c, d, e]) and photodetection pulses (QB1 [a, b, c, d, e]) are emitted respectively. Each of the pulses of the photodetection pulses (PB1 [a, b, c, d, e]) and the photodetection pulses (QB1 [a, b, c, d, e]) matches each of the pulsed lights of the correction pulsed lights (B1 [a, b, c, d, e]), and these have the relation as shown in FIG. 2 respectively. For instance, PB1 [a] and QB1 [a] match B1 [a]. There is a time difference of U2 between B1 [a] and PB1 [a], and there is a time difference of V2 between B1 [a] and QB1 [a].

Association is made on the pulse signal amount and the photodetection time difference when the correction pulsed lights are received by the first photodetection element 28 and the second photodetection element 33, and the data are stored in the storage unit 48.

When the distance measuring light is emitted and the distance measuring light is received by the first photodetection element 28, the photodetection pulse PA1 is sent out to the control arithmetic unit 42. At the control arithmetic unit 42, the photodetection pulse (PB1 [a, b, c, d, e]) signal stored in the storage unit 48 is compared with the photodetection pulse PA1 and a photodetection pulse signal is selected, which has a value equal to or approximately equal to the signal value. In the case shown in FIG. 7, PB1 [c] is selected, which is approximately equal to the photodetection pulse PA1. Further, the photodetection pulse signal QB1 [c] of the second photodetection element 33, which matches PB1 [c], is selected. By the light amount adjusting means 38, light intensity of the internal reference pulsed light is changed from the maximum operation light amount to the minimum operation light amount. QA2 is selected, which is equal to or approximately equal to the photodetection pulse PA1. One of QBn closer to QA2 in time is selected as a photodetection pulse signal, which is based on the correction pulsed light same to [c] selected for PB1. In FIG. 7, it is QB2 [c]. From the photodetection time difference obtained from each of the photodetection pulses, a distance is calculated in similar manner as the case of the first embodiment.

It is also possible to measure the distance for each measured pulsed light in the present embodiment. Because there is no need to perform mechanical switching of optical paths and no need of density adjustment, distance measurement can be made for multiple points at high speed.

Figure 5:
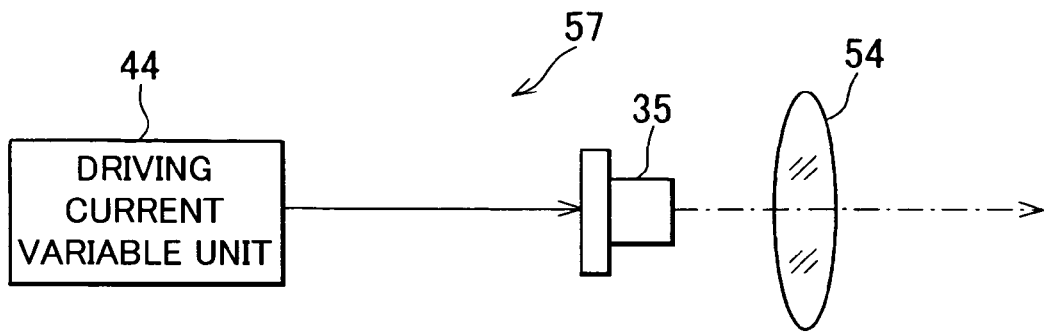
FIG. 5 is a schematical drawing to show essential portions in a third embodiment of the invention.

FIG. 5 shows a third embodiment of the invention. In the third embodiment, light is emitted by changing the light intensity of the second light source 35 for each pulse by the second light emitting element driving circuit 44. For example, light emission intensity of the second light source 35 is changed in 10 steps. The operation in the present embodiment is the same as described in the case shown in FIG. 7, and detailed description is omitted.

Figure 6:
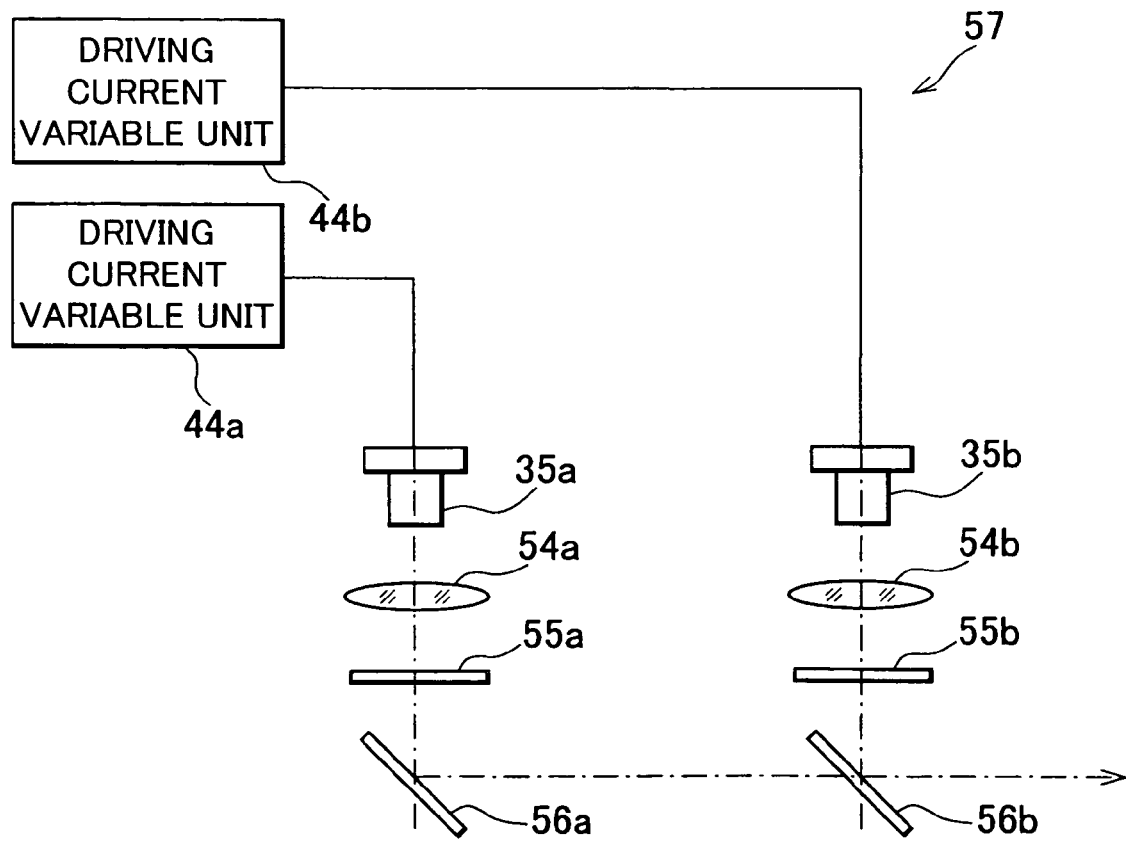
FIG. 6 is a schematical drawing to show essential portions in a fourth embodiment of the invention.

FIG. 6 shows a fourth embodiment of the present invention, and the fourth embodiment is a combination of the second embodiment and the third embodiment as described above. In the fourth embodiment, there are provided a plurality of second light sources 35a and 35b, collimator lenses 54a and 54b, and ND filters 55a and 55b, a mirror 56a and a half-mirror 56b to match the second light sources 35a and 35b. Light emission intensity of the second light sources 35a and 35b are changed for each pulse by the second light emitting element driving circuits 44a and 44b, and light amount is changed in 2 steps by the ND filters 55a and 55b and by the mirror 56a and the half-mirror 56b.

In the fourth embodiment, light emission intensities of a plurality of the second light sources 35a and 35b are adjusted individually. Further, density is optically adjusted by the ND filters 55a and 55b. Thus, it is possible to adjust density in more multiple steps. Or, the adjusting of light emission intensity can be simplified for one of the second light sources 35.

Next, as described above, there is individual difference in the first light source 21, the second light source 35, the first photodetection element 28, the second photodetection element 33, etc. and errors are also included in the light emitting circuit and the photodetection circuit. These errors are given in (Equation 2) to (Equation 8) as given below. In the equations, symbols are defined as follows:

tL1: Light emitting time of the first light source 21
ΔtL1 (including delay time of light emitting circuit):
  Light emitting delay time of the first light source 21
tL2: Light emitting time of the second light source
ΔtL2 (including delay time of light emitting circuit):
  Light emitting delay time of the second light source 35

Causes of errors in photodetection system to the pulsed light from the first light source 21
ΔR1 (including delay time of photodetection circuit):
  Delay time of the first photodetection element 28
RA1 (including amplitude error of the photodetection circuit):
  Amplitude error of the first photodetection element 28
ΔR2 (including delay time of photodetection circuit):
  Delay time of the second photodetection element 33
RA2 (including amplitude error of photodetection circuit):
  Amplitude error of the second photodetection element 33

Causes of errors of photodetection system to the pulsed light from the second light source 35
ΔR1$n$ (including delay time of photodetection circuit):
  Delay time of the first photodetection element 28
RA1$n$ (including amplitude error of photodetection circuit):
  Amplitude error of the first photodetection element 28
ΔR2$n$ (including delay time of photodetection circuit):
  Delay time of the second photodetection element 33
RA2$n$ (including amplitude error of photodetection circuit)
  Amplitude error of the second photodetection element 33

★"n" represents an arbitrary value selected from different amplitude values as obtained from the second light source 35, for which light amount is varied by the light amount adjusting means 38.

tL1$o$: Time delay in the measuring light distance
tL1$i$: Time delay in the distance of internal reference light
tL2$o$: Time delay in the distance of the first correction light
tL2$i$: Time delay in the distance of the second correction light Delay time on the measuring light optical path $$(tL1+\Delta tL1+tL1o)+(\Delta R1+RA1) \quad \text{(Equation 2)}$$

Delay time on the internal reference light optical path $$(tL1+\Delta tL1+tL1i)+(\Delta R2+RA2) \quad \text{(Equation 3)}$$

(Equation 2)-(Equation 3)

$$tL1o-tL1i+\Delta R1-\Delta R2+RA1-RA2 \quad \text{(Equation 4)}$$

Delay time on the first correction light optical path $$(tL2+\neq tL2+tL2o)+(\Delta R1n+RA1n) \quad \text{(Equation 5)}$$

Delay time on the second correction light optical path $$(tL2+\Delta tL2+tL1i)+(\Delta R2n+RA2n) \quad \text{(Equation 6)}$$

(Equation 5)-(Equation 6)

$$tL2o-tL2i+\Delta R1n-\Delta R2n+RA1n-RA2n \quad \text{(Equation 7)}$$

In case the interval to measure the pulsed light from the first light source 21 and the pulsed light from the second light source 35 is sufficiently short compared with the changes of delay time of the photodetection element, it can be regarded that the following relations exist:

$$\Delta R1=\Delta R1n;\ \Delta R2=\Delta R2n$$

(Equation 4)-(Equation 7)

$$tL1o-tL1i-(tL2o-tL2i)+(RA1-RA2)-(RA1n-RA2n) \quad \text{(Equation 8)}$$

Now, description will be given according to the waveforms shown in FIG. 7. By using the light amount adjusting means 38, the following equation 9 can be derived through measurement of delay time of: Photodetection pulse QA2 of internal reference light optical path having the same pulse amplitude as the pulse amplitude of the photodetection pulse PA1 of the measuring light optical path 29, photodetection pulse PB1 [c] closer to the photodetection pulse PA1 of the measuring light optical path, and the photodetection pulse QB2 [c] closer in time to the photodetection pulse QA2:

$$(RA1-RA2)-(RA1n-RA2n)\approx 0 \quad \text{(Equation 9)}$$

Therefore, the influence of errors caused by amplitude can be avoided.

Because internal reference light optical path length, the first correction light optical path length, and the second correction light optical path length are already known, it is possible to obtain the measuring light optical path length.

Figure 8:
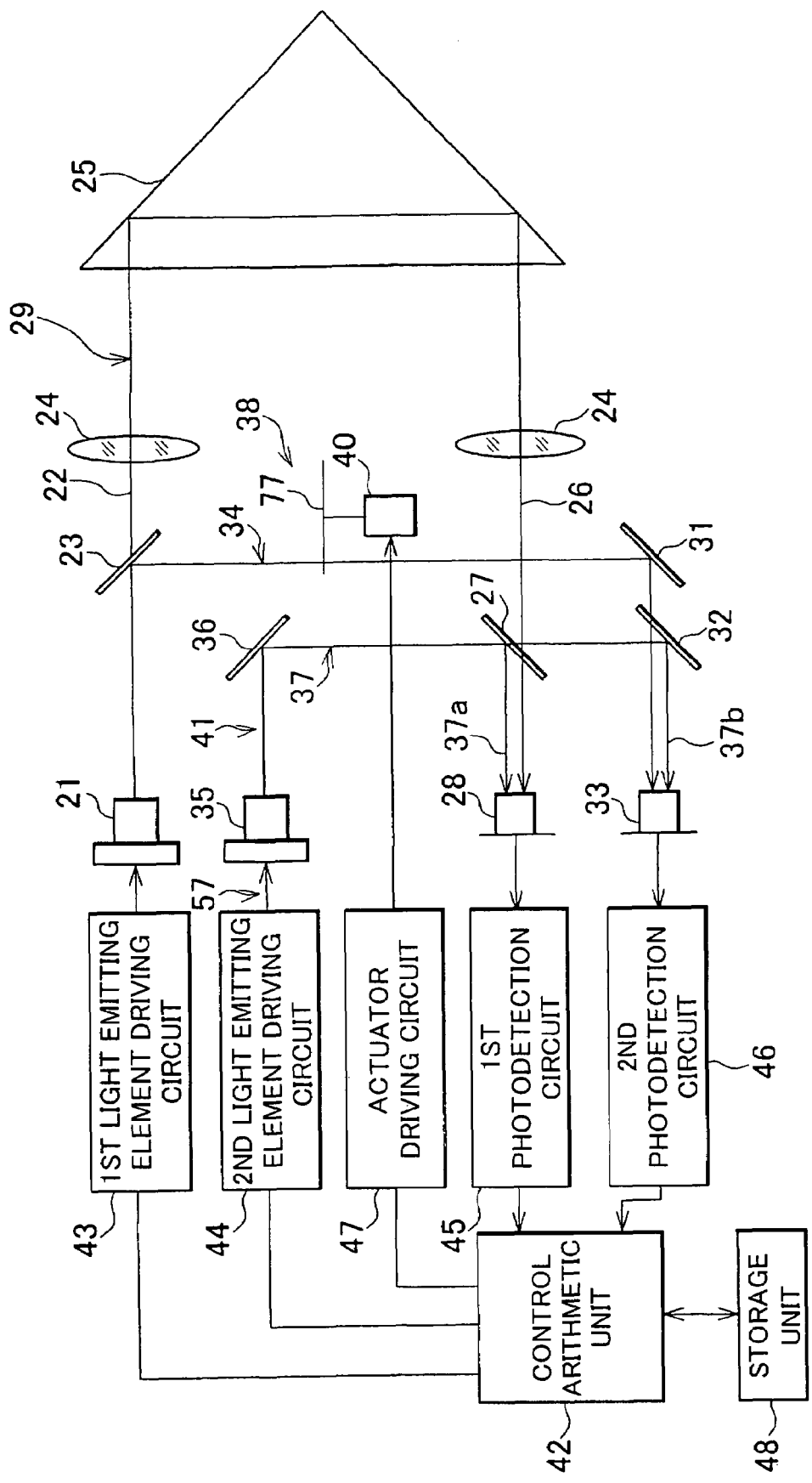
FIG. 8 is a schematical drawing of a fifth embodiment of the present invention.

FIG. 8 shows a fifth embodiment of the invention. In FIG. 8, the equivalent component as in FIG. 1 is referred by the same symbol. Similarly to the first embodiment, the fifth embodiment has the distance measuring light optical path 29, the internal reference light optical path 34, and the correction light optical path 37. In the fifth embodiment, the light amount adjusting means 38 is arranged at a required position on the internal reference light optical path 34, e.g. between the first half-mirror 23 and the first mirror 31.

The light amount adjusting means 38 comprises a disk-like density variable filter 77 to traverse the internal reference light optical path 34 and an actuator 40 such as a motor to rotate the density variable filter 77, and the density variable filter 77 has a continuous density gradient in circumferential direction. Through the rotation of the density variable filter 77 by the actuator 40, the density at a position to intercept the internal reference light optical path 34 is gradually changed, and light intensity of the internal reference pulsed light to transmit the density variable filter 77 is gradually decreased (see FIG. 3). For instance, a range where the density is 0 is present for a given angle, and the density is increased with the change of the angle. Density change may be linear change or density change may be a change in quadratic curve etc. or density change may be exponential change or density change may be stepwise change. In short, it will suffice if there is matching relation between angular change and density change.

The control arithmetic unit 42 controls light emitting condition of the second light source 35 by the second light emitting element driving circuit 44. The control arithmetic unit 42 issues a control signal to the actuator driving circuit 47. The actuator 40 is driven by the actuator driving circuit 47, and the density variable filter 77 is rotated.

The density variable filter 77 may be designed in form of a tablet so that density is increased linearly, and it may be reciprocally driven by means such as a linear motor.

The light source unit 57 emits a correction pulsed laser beam along the correction light optical path 37, and the light source unit 57 comprises the light amount adjusting means to change the light amount of the correction pulsed laser beam stepwise or continuously. As the light amount adjusting means, the means as shown in FIG. 4 or in FIG. 5 or in FIG.

6 is used. Now, description will be given below on a case where the light source unit 57 as shown in FIG. 4 is used.

Except the light amount adjusting means 38 and the light source unit 57, it is similar to the first embodiment, and description is not given here.

Figure 9:
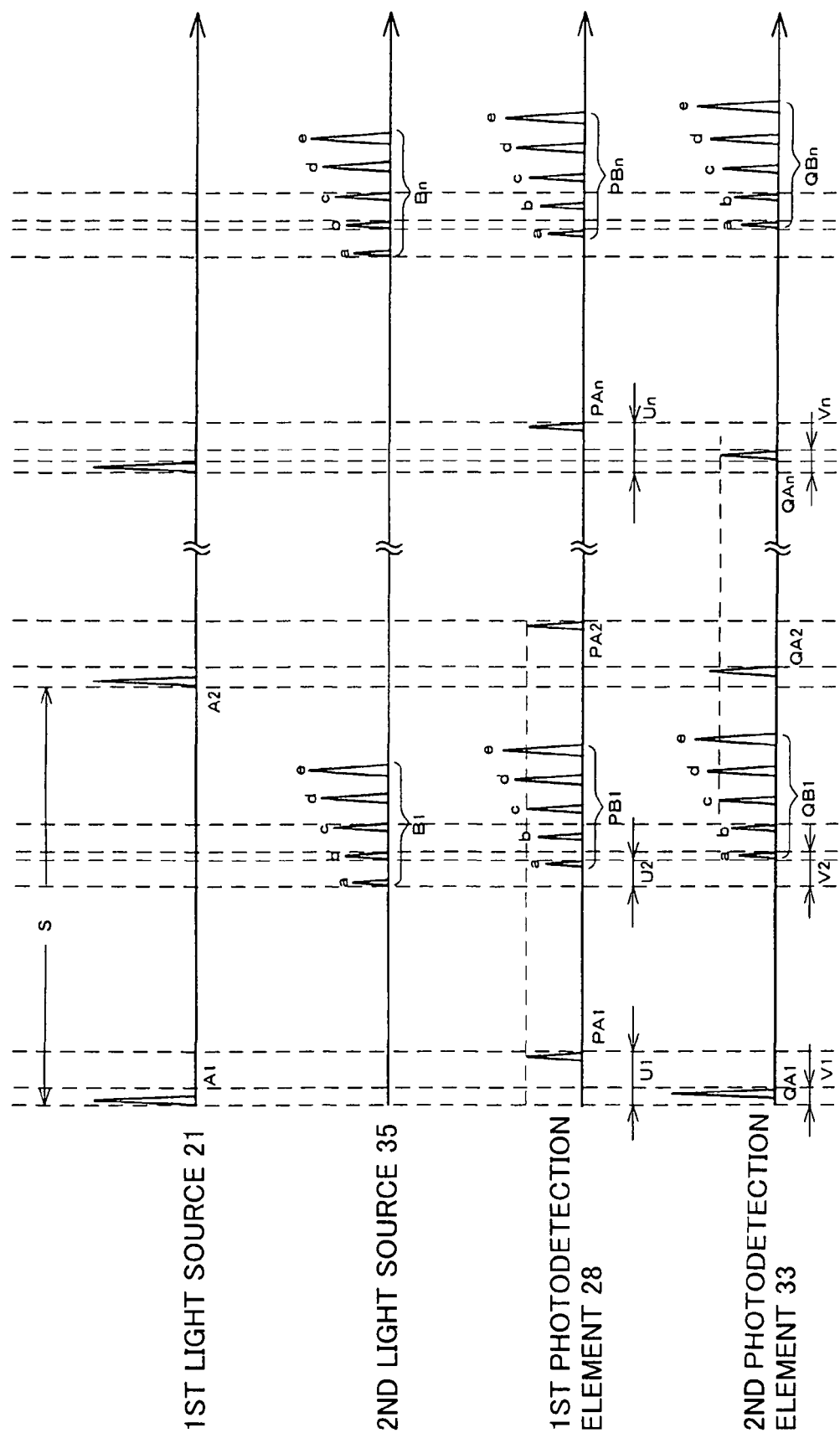
FIG. 9 is a diagram to show light emitting conditions of a first light source and a second light source and photodetecting (light receiving) conditions of a first photodetection element and a second photodetection element in the fifth embodiment of the invention.

Now, description will be given on operation of the fifth embodiment referring to FIG. 9.

When the distance measuring light pulsed lights A1 and A2 are emitted from the first light source 21, the pulsed lights are received by the first photodetection element 28 and the second photodetection element 33 respectively, and the photodetection pulse PA1 and the photodetection pulse QA1 are emitted respectively.

During the light emission cycle S when the distance measuring pulsed lights A1, A2 . . . are emitted, the correction pulsed lights (B1 [a, b, c, d, e]) with different light amounts are emitted one after another from the second light sources 35a, 35b, 35c, 35d, . . . Light emission timing of the second light sources 35a, 35b, 35c, 35d, . . . has sufficient time interval as the photodetection pulse PA1 is emitted by the first photodetection element 28, and it is so arranged that the time when the second light sources 35a, 35b, 35c, 35d, . . . finish the light emission is not overlapped with the time of the emission of the distance measuring pulsed light A2.

When the correction pulsed lights (B1 [a, b, c, d, e]) are emitted, the correction pulsed lights (B1 [a, b, c, d, e]) are received by the first photodetection element 28 and the second photodetection element 33, and photodetection pulses (PB1 [a, b, c, d, e]) and photodetection pulses (QB1 [a, b, c, d, e]) are emitted respectively. To each of the pulsed lights of the correction pulsed lights (B1 [a, b, c, d, e]), each of the photodetection pulses (PB1 [a, b, c, d, e]) and the photodetection pulses (QB1 [a, b, c, d, e]) matches, and the relation shown in FIG. 9 is maintained respectively. For instance, PA1 and QA1 match A1. There is a time difference of U1 between A1 and PA1, and there is a time difference of V1 between A1 and QA1. PB1 [a] and QB1 [a] match B1 [a]. There is a time difference of U2 between B1 [a] and PB1 [a], and there is a time difference of V2 between B1 [a] and QB1 [a].

Specifically, the time U1 matches optical path length of the distance measuring light optical path 29, and the time V1 matches optical path length of the internal reference light optical path 34. The time U2 matches optical path length of the correction light optical path 37a from the second light source 35 to the first photodetection element 28. The time V2 matches optical path length of the correction light optical path 37b from the second light source 35 to the second photodetection element 33.

Association is made on each pulse signal amount and each photodetection time difference when the correction pulsed lights are received by the first photodetection element 28 and the second photodetection element 33 respectively, and the data are stored in the storage unit 48.

When the distance measuring light is emitted and the distance measuring light is received by the first photodetection element 28, a photodetection pulse PA1 signal is issued from the first photodetection element 28, and the photodetection pulse PA1 is sent out to the control arithmetic unit 42. At the control arithmetic unit 42, the photodetection pulses (PB1 [a, b, c, d, e]) of the correction pulsed light stored in the storage unit 48 are compared with the photodetection pulse PA1 signal. Among the photodetection pulse (PB1 [a, b, c, d, e]) signals, a photodetection pulse signal, e.g. PB1 [c] is selected, which has a photodetection signal value equal to or approximately equal to the signal value.

Further, pulsed light of the laser beam is emitted from the first light source 21. At the same time, the actuator 40 is driven by the actuator driving circuit 47, and the density variable filter 77 is rotated. By the rotation of the density variable filter 77, the light intensity of the internal reference light transmitting the density variable filter 77 is decreased for each pulse.

The internal reference light with light intensity gradually decreased is received by the second photodetection element 33. Among the photodetection pulses (QB1 [a, b, c, d, e]) received and stored in the storage unit 48 before, the internal reference light is compared with the intensity of QB1 [c] to match PB1 [c]. The pulse signal QAn (n-th light emitted during the rotation of the density variable filter 77 by the first light source 21) of the internal reference light equal to the intensity of the photodetection pulse QB1 [c] is taken by the second photodetection circuit 46.

Therefore based on the time difference between the time Un to match the photodetection pulse PAn received and emitted from the first photodetection element 28 and the time Vn to match the photodetection pulse QAn received and emitted by the second photodetection element 33, and also, based on the time difference between the time U2c to match PB1 [c] emitted by the first photodetection element 28 and the time V2c to match QB1 [c], the difference of optical path lengths between the distance measuring light optical path 29 and the internal reference light optical path 34 (i.e. measured distance) is calculated. Also, based on optical path length difference between the first photodetection element 28 and the second photodetection element 33 on the correction light optical path 37, and further, based on individual difference between the first photodetection element 28 and the second photodetection element 33, time difference is calculated. Based on the optical path length difference of the correction light optical path 37 and on the individual difference, the measured distance is corrected, and distance measurement with high accuracy can be carried out.

Because light emission cycle of the first light source 21 is in a range of several KHz to several tens of KHz, for instance, even when light amount adjustment of the reference light pulse by the light amount adjusting means 38 is performed, it is possible to measure the distance at high speed.

Next, description will be given on a distance measuring device embodied the present invention referring to FIG. 10 and FIG. 11.

A distance measuring device 59 shown in FIG. 10 comprise a distance measuring unit as described above. The distance measuring device 59 projects a distance measuring light 60 along a distance measuring light optical path 29 and can project the distance measuring light 60 by rotary irradiation. During the rotary irradiation, distances to a plurality of points of the object 25 to be measured irradiated by the distance measuring light 60 can be measured.

Figure 11:
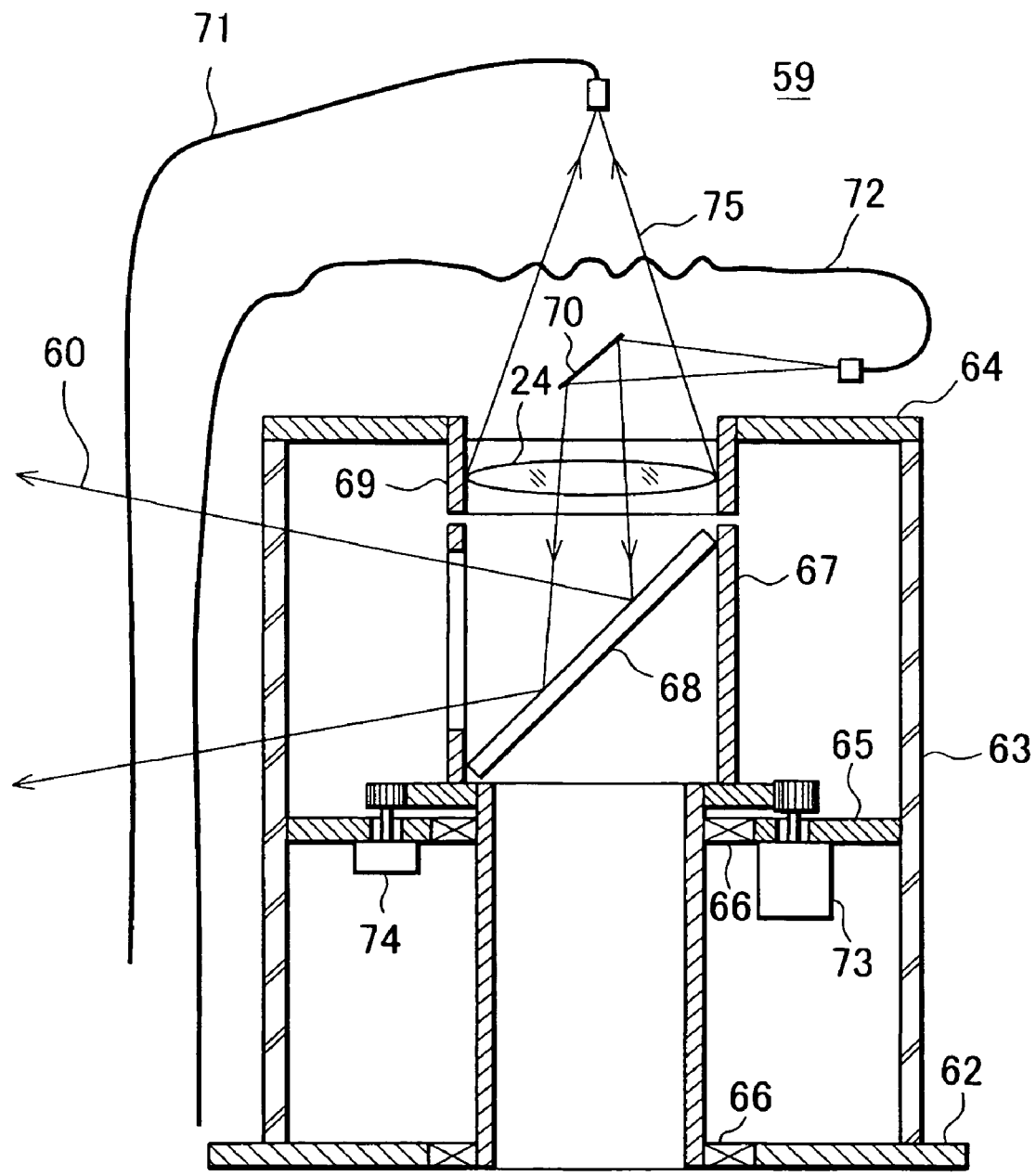
FIG. 11 is a cross-sectional view to show general features of a rotary irradiation unit of the distance measuring device.
Figure 12:
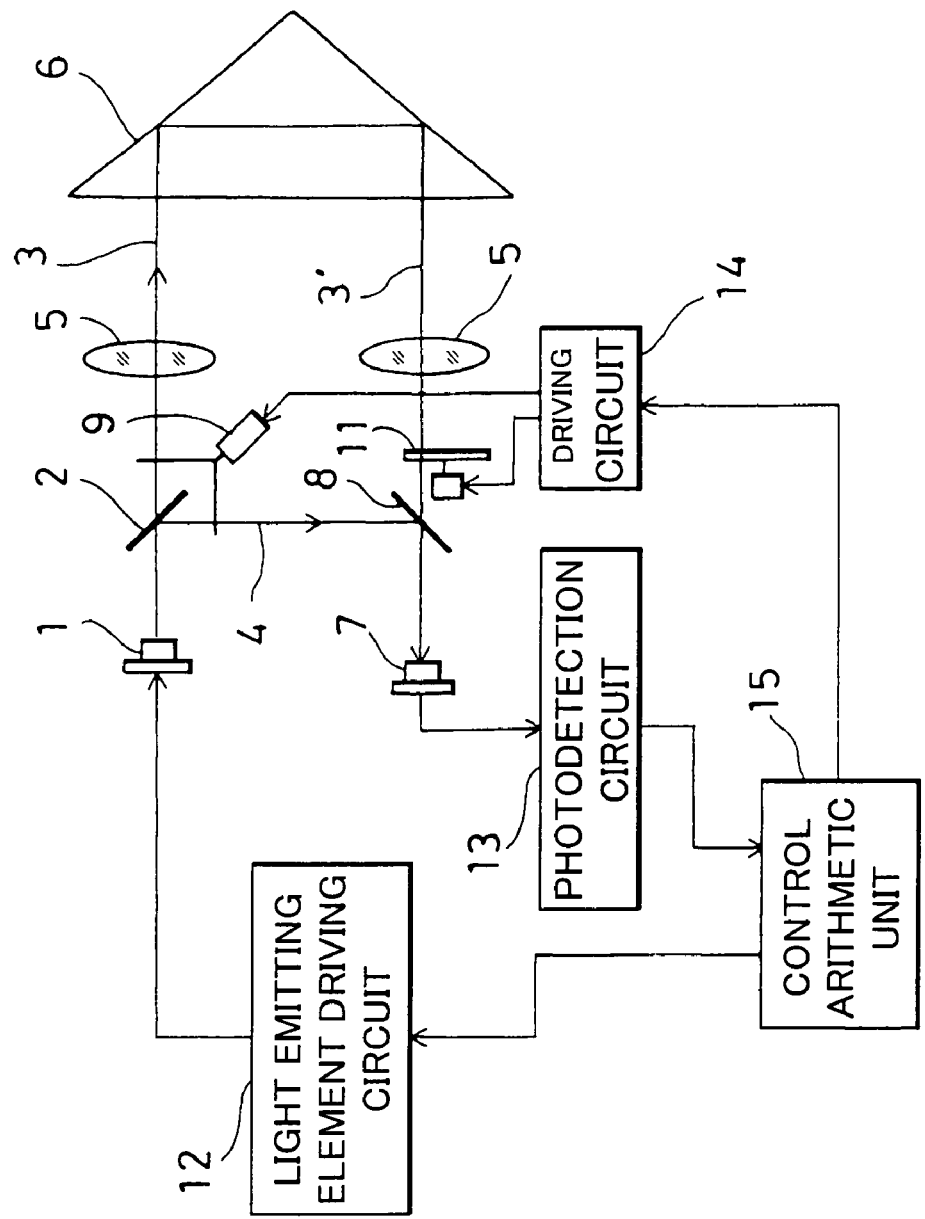
FIG. 12 is a schematical block diagram to show a conventional type distance measuring device.

FIG. 11 shows general outline of a rotary irradiation unit of the distance measuring device 59. For example, a rotary irradiation unit of a total station is shown. In FIG. 11, the component referred and shown in FIG. 1 is referred by the same symbol.

On an upper side of a base plate 62, a light projection window 63 in cylindrical shape is arranged, and the light projection window 63 is made of a material such as transparent glass. At an upper end of the light projection window 63, an upper base plate 64 is arranged, and an intermediate based plate 65 is provided inside the light projection window 63.

A mirror holder 67 is rotatably mounted on the base plate 62 and the intermediate base plate 65 via bearings 66, and a mirror 68 is held by the mirror holder 67.

A lens holder 69 is provided on the upper base plate 64, and an objective lens 24 is held on the lens holder 69. Optical axis of the objective lens 24 (distance measuring light optical path 29; see FIG. 1) is aligned with the rotation center of the mirror holder 67. On optical axis of the objective lens 24, a deflection mirror 70 with a radius smaller than that of the objective lens 24 and incident end surface of a photodetection side optical fiber 71 are arranged. A reflected distance measuring light 75 enters the photodetection side optical fiber 71. The photodetection side optical fiber 71 guides the reflected distance measuring light toward the first photodetection element 28. On the optical axis deflected by the deflection mirror 70, an exit end surface of a light emission side optical fiber 72 is arranged. The light emission side optical fiber 72 guides the distance measuring light from the first light source 21 toward the objective lens 24.

The mirror holder 67 is rotated by a scanning motor 73, and a projecting direction of the distance measuring light 60 (projected horizontal angle) is detected by an encoder 74.

The driving of the scanning motor 73 is controlled by the control arithmetic unit 42 (see FIG. 1). An angle when the reflected distance measuring light reflected by the object 25 to be measured is received by the first photodetection element 28 via the photodetection side optical fiber 71 is detected by the encoder 74, and the detected angle is stored in the storage unit 48 via the control arithmetic unit 42.

The measurement by the distance measuring device 59 is performed under the condition that the distance measuring light 60 is projected and the mirror holder 67 is continuously rotated by the scanning motor 73.

The distance measuring light 60 emitted from the light emission side optical fiber 72 is continuously projected by rotary irradiation. By projecting the distance measuring light 60 to the objects 25 to be measured at the points as required, the reflected distance measuring light from the objects 25 to be measured enters the mirror 68. Further, the distance measuring light 60 enters into the photodetection side optical fiber 71 through the objective lens 24 and is received by the first photodetection element 28 via the photodetection side optical fiber 71, and a distance measurment to the object 25 to be measured is performed. The projecting direction of the distance measuring light 60 is detected by the encoder 74 to match the photodetection from the first photodetection element 28. Thus, the result of distance measurement matches the angle of the projecting direction, and the result of distance measurement is stored in the storage unit 48. Because the projecting direction is detected, the object 25 to be measured under the measurement can be specified at the same time.

When it is necessary to perform automatic surveying for the purpose of 3-dimensional measurement of an object such as a building, a rotation angle is set up, and by reciprocally scanning in the range of the angle as set up, distance is measured at a predetermined time interval.

As described in the embodiments given above, the switching of the internal reference light and the distance measuring light and switching of light amount adjustment during the measurement can be carried out by switching of electric signals etc., and no mechanical operation is involved. As a result, it is possible to perform the measurement at multiple points at high speed.

What is claimed is:

1. A distance measuring device for measuring a distance by projecting a pulsed laser beam to an object to be measured and by receiving a reflected light from the object to be measured, comprising a first light emitting unit for projecting a pulsed laser beam for distance measurement, a second light emitting unit for emitting a correction pulsed laser beam, a distance measuring light optical path to guide the pulsed laser beam for distance measurement toward a first photodetection unit, an internal reference light optical path for splittinq an internal reference pulsed light from the pulsed laser beam for distance measurement and for guiding to a second photodetection unit, a correction light optical path for splitting the correction pulsed laser beam and for guiding to the first photodetection unit and the second photodetection unit, a light amount adjusting means for repeatedly changing light intensities of the correction pulsed laser beam and the internal reference pulsed light from the maximum to the minimum, a storage unit for storing a plurality of photodetection signals from said first photodetection unit and said second photodetection unit which are obtained by changing the light intensities of the correction pulsed laser beam and the internal reference pulsed light from the maximum to the minimum, and a control arithmetic unit for calculating a distance based on difference of photodetection time of the pulsed lights from the first photodetection unit and the second photodetection unit, wherein said control arithmetic unit calculates a distance by using a combination of the reflected light with the stored internal reference pulsed light having a light intensity equal to or approximately equal to the light intensity of the reflected light.

2. A distance measuring device according to claim 1, wherein said light amount adjusting means is stretched over said internal reference light optical path and said correction light optical path.

3. A distance measuring device according to claim 1, wherein said light amount adjusting means is provided independently on each of said internal reference light optical path and said correction light optical path.

4. A distance measuring device according to claim 1, wherein light intensity of the internal reference pulsed light is varied by said light amount adjusting means provided on said internal reference light optical path, and light intensity of the correction pulsed laser beam is varied by varying the output of said second light emitting unit.

5. A distance measuring device according to claim 1 or 4, wherein said light amount adjusting means comprises a density variable filter to change density in moving direction and said light amount adjusting means is so arranged that light intensities of the correction pulsed laser beam and the internal reference pulsed light are adjusted by moving said density variable filter.

6. A distance measuring device according to claim 1 or 4, wherein said light amount adjusting means comprises a plurality of light sources for emitting the correction pulsed laser beams and also comprises optical members for adjusting light amount of said light sources to each light source, wherein light intensity of the correction pulsed laser beam is adjusted by selectively turning on said plurality of light sources.

7. A distance measuring device according to claim 1 or 4, wherein said light amount adjusting means comprises a light source for emitting the correction pulsed laser beam and a control arithmetic unit for adjusting light emitting intensity of said light source.

8. A distance measuring device according to claim 7, wherein said control arithmetic unit comprises said wherein said storage unit respectively stores a photodetection signal of said first photodetection unit and a photodetection signal of said second photodetection unit to match each correction pulsed laser beam with light intensity adjusted, and said storage unit stores the photodetection signal of said second photodetection unit to match each internal reference pulsed light with light intensity adjusted, and wherein said control arithmetic unit selects a photodetection signal by the correction pulsed laser beam equal to or approximately equal to the photodetection signal at the receiving of the reflected distance measuring light from the stored photodetection signals by said first photodetection unit, photodetection signals a photodetection signal by internal reference pulsed light equal to or approximately equal to a photodetection signal when the reflected distance measuring light is received, and calculates the measurement distance from the reflected distance measuring light and the internal reference pulsed light based on a relation between the photodetection signal of the selected internal reference pulsed light and the photodetection signal of the reflected distance measuring liqht.

9. A distance measuring device according to claim 1 or 4, wherein said light amount adjusting means comprises a plurality of light sources for emitting the correction pulsed laser beams and optical members for adjusting light amount of the light sources to each light source, and said control arithmetic unit for turning on selectively said plurality of light sources and for adjusting light emitting intensity of the light sources.

10. A distance measuring device according to claim 9, wherein said control arithmetic unit comprises said wherein said storage unit respectively stores a photodetection signal of said first photodetection unit and a photodetection signal of said second photodetection unit to match each correction pulsed laser beam with light intensity adjusted, and said storage unit stores the photodetection signal of said second photodetection unit to match each internal reference pulsed light with light intensity adjusted, and wherein said control arithmetic unit selects a photodetection signal by the correction pulsed laser beam equal to or approximately equal to the photodetection signal at the receiving of the reflected distance measuring light from the stored photodetection signals by said first photodetection unit. selects from the stored photodetection signals a photodetection signal by -internal reference pulsed light equal to or approximately equal to a photodetection signal when the reflected distance measuring light is received, and calculates the measurement distance from the reflected distance measuring light and the internal reference pulsed light based on a relation between the photodetection signal of the selected internal reference pulsed light and the photodetection signal of the reflected distance measuring light.

11. A distance measuring device according to claim 1 or 4, wherein said correction pulsed laser beam is emitted alternately with the distance measuring pulsed light, and adjustment of the light intensity of the correction pulsed laser beam is performed for each light emission.

12. A distance measuring device according to claim 1 or 4, wherein said correction pulsed laser beam is emitted at given times within a light emission cycle of the distance measuring pulsed light, and the light intensity of the correction pulsed laser beam is changed each time the light is emitted.

13. A distance measuring device according to claim 1, wherein said storage unit respectively stores a photodetection signal of said first photodetection unit and a photodetection signal of said second photodetection unit to match each correction pulsed laser beam with light intensity adjusted, and said storage unit stores the photodetection signal of said second photodetection unit to match each internal reference pulsed light with light intensity adjusted, and wherein said control arithmetic unit selects a photodetection signal by the correction pulsed laser beam equal to or approximately equal to the photodetection signal at the receiving of the reflected distance measuring light from the stored photodetection signals by said first photodetection unit, selects from the stored photodetection signals a photodetection signal by internal reference pulsed light equal to or approximately equal to a photodetection signal when the reflected distance measuring light is received, and calculates the measurement distance from the reflected distance measuring light and the internal reference pulsed light based on a relation between the photodetection signal of the selected internal reference pulsed light and the photodetection signal of the reflected distance measuring light, and corrects the measurement distance based on the photodetection difference of said first photodetection unit and said second photodetection unit of the selected correction pulsed laser beam.

\* \* \* \* \*